(12) United States Patent
Kim et al.

(10) Patent No.: US 10,009,452 B2
(45) Date of Patent: Jun. 26, 2018

(54) ELECTRONIC DEVICE AND CONTROL METHOD THEREOF

(71) Applicant: SAMSUNG ELECTRONICS CO., LTD., Suwon-si, Gyeonggi-do (KR)

(72) Inventors: Junhyung Kim, Yongin-si (KR); Deepraj Prabhakar Patkar, Suwon-si (KR); Dusan Baek, Seoul (KR); Dongkeon Kong, Suwon-si (KR); Bonhyun Koo, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/335,612

(22) Filed: Oct. 27, 2016

(65) Prior Publication Data

US 2017/0118323 A1   Apr. 27, 2017

(30) Foreign Application Priority Data

Oct. 27, 2015   (KR) .................. 10-2015-0149437

(51) Int. Cl.
*H04B 5/00*   (2006.01)
*H04W 4/02*   (2018.01)
(Continued)

(52) U.S. Cl.
CPC ........ *H04M 1/72533* (2013.01); *H01Q 1/243* (2013.01); *H04M 1/7253* (2013.01);
(Continued)

(58) Field of Classification Search
CPC ....... H04W 4/00; H04W 4/008; H04W 4/025; H01Q 1/22; H01Q 1/243; H04M 1/72;
(Continued)

(56) References Cited

U.S. PATENT DOCUMENTS 9,530,262 B2 * 12/2016 Johnson ............. G07C 9/00007
9,697,656 B2 *  7/2017 Trani ................. G07C 9/00007
(Continued)

FOREIGN PATENT DOCUMENTS

JP    2015-154276    8/2015

OTHER PUBLICATIONS

Search Report dated Jan. 25, 2017 in counterpart International Patent Application No. PCT/KR2016/012129.

*Primary Examiner* — Blane Jackson
(74) *Attorney, Agent, or Firm* — Nixon & Vanderhye, P.C.

(57) ABSTRACT

An electronic device, a related mobile device, and control methods thereof are provided. The electronic device includes a transceiver, a switch unit including switching circuitry, and a controller. The transceiver includes a first antenna having first directionality toward a first directional area, a second antenna having second directionality toward a second directional area, and a third antenna having omnidirectionality in all directions. The switching circuitry selectively activates or deactivates each antenna. The controller controls the switching circuitry to deactivate the third antenna and activate the second antenna when a first event occurs in connection with a mobile device located in the first directional area during omnidirectional communication through the third antenna.

14 Claims, 28 Drawing Sheets

(51) Int. Cl.
*H04M 1/725* (2006.01)
*H01Q 1/24* (2006.01)
*H04W 4/00* (2018.01)
*H04W 52/02* (2009.01)

(52) U.S. Cl.
CPC ........... *H04W 4/008* (2013.01); *H04W 4/025* (2013.01); *H04W 52/0254* (2013.01); *Y02B 60/50* (2013.01)

(58) Field of Classification Search
CPC ... H04M 1/72533; H04B 5/00; H04B 5/0031; H04B 5/0056; H04B 5/0075; H04B 5/0087
See application file for complete search history.

(56) References Cited

U.S. PATENT DOCUMENTS

| | | | |
|---|---|---|---|
| 9,697,661 B1 * | 7/2017 | Dumas | G07C 9/00182 |
| 2004/0242273 A1 | 12/2004 | Corbett et al. | |
| 2013/0273856 A1 | 10/2013 | Park | |
| 2014/0148095 A1 * | 5/2014 | Smith | H04B 5/02 455/41.1 |
| 2014/0292481 A1 | 10/2014 | Dumas et al. | |
| 2015/0017979 A1 | 1/2015 | Kang et al. | |
| 2016/0350992 A1 * | 12/2016 | Telljohann | G07C 9/00309 |
| 2017/0186256 A1 * | 6/2017 | Dumas | G07C 9/00182 |
| 2017/0256107 A1 * | 9/2017 | Trani | G07C 9/00007 |

* cited by examiner

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2015-0149437, filed in the Korean Intellectual Property Office on Oct. 27, 2015, the disclosure of which is incorporated by reference herein in its entirety.

TECHNICAL FIELD

The disclosure relates generally to an electronic device, a related mobile device, and control methods thereof. For example, the disclosure relates to an electronic device having a plurality of antennas, and also to a mobile device for performing communication with the electronic device and thereby changing a status thereof.

BACKGROUND

The Internet has recently evolved from a traditional human-centric network, which allows users to create and consume information, into an internet of things (IoT) network which allows distributed things to exchange and process information. Further, such IoT technology is now growing into an internet of everything (IoE) technology through a combination of big data processing technology based on a connection with a cloud server or the like. In order to realize IoT or IoE, various related technologies such as sensing technique, infrastructure for wired/wireless communication and network, service interface technique, and security technique are also required. In addition, sensor network technology, machine-to-machine (M2M) technology, machine type communication (MTC) technology, etc. are studied in these days.

In IoT environments, intelligent internet technology services for collecting and analyzing various kinds of data from connected things and then creating a new value to the human life may be provided. Moreover, through convergence and integration between the existing information technology (IT) and several industries, IoT technology may be applied to a great variety of industrial fields such as a smart home, a smart building, a smart city, a smart car or a connected car, a smart grid, a healthcare, smart home appliances, and a high-tech medical service.

Meanwhile, in accommodations such as a hotel, technique for detecting whether a user occupies a room is often required in order to keep a room hospitable.

Normally, a user can open a door of a room using a suitable key such as a card key. Recently, as the use of a mobile device is popularized, a user can open a door using his or her mobile device that stores information for opening a door.

Therefore, an electronic device such as a door lock installed on a door of a room may communicate with a user's mobile device and also determine whether a user occupies the room.

In case of such a door lock that has a smart function for communicating with a user's mobile device as discussed above as well as a traditional function for locking a door, an increase of power consumption is unfortunately caused. This issue may be more serious in a large-scale building or hotel.

Accordingly, there is a need to reduce power consumption of an electronic device such as a door lock while exactly or more precisely determining whether a user occupies a room.

SUMMARY

The present disclosure provides an electronic device for determining the location of a user having a mobile terminal, and a method for minimizing and/or reducing the power consumption thereof.

According to an example embodiment of the disclosure, an electronic device may include a transceiver configured to perform communication using a first antenna having first directionality toward a first directional area, a second antenna having second directionality toward a second directional area, and a third antenna having omni-directionality in all directions; switching circuitry configured to activate or deactivate each of the first, second and third antennas; and a controller configured to control the switching circuitry to deactivate the third antenna and activate the second antenna when a first event occurs in connection with a mobile device located in the first directional area during omnidirectional communication through the third antenna.

In this example electronic device, the controller may be further configured to control the switching circuitry to deactivate the second antenna and activate the third antenna when the mobile device is moved to the second directional area during activation of the second antenna.

Additionally, the controller may be further configured to control the switching circuitry to deactivate the third antenna and activate the first antenna when a second event occurs while the mobile device is located in the second directional area and omnidirectional communication is performed through the third antenna.

In this example electronic device, the controller may be further configured to change a status of the electronic device from a first status to a second status when the mobile device is moved to the second directional area during activation of the second antenna.

In this example electronic device, the first event may be an event of receiving room key information from the mobile device through the third antenna, and the controller may be further configured to control the third antenna to transmit room number information and, when the room key information is received through the third antenna, to control the switching circuitry to deactivate the third antenna and activate the second antenna.

In this example electronic device, when a confirm message is received from the mobile device through the activated second antenna, the controller may be further configured to determine that the mobile device is moved to the second directional area, and to control the switching circuitry to deactivate the second antenna and activate the third antenna.

Additionally, the second event may be a door open event, and when a confirmation message is received from the mobile device through the activated first antenna within a predetermined time, the controller may be further configured to control the switching circuitry to deactivate the first antenna and activate the third antenna.

According to an example embodiment of the disclosure, a mobile device may include a short range transceiver configured to perform short range communication with an electronic device and having a proximity function; and a controller configured to, if a predetermined event occurs and if a status information message is received from the electronic device, control the proximity function and a status of the mobile device, based on the received status information message.

In this example mobile device, if key information is exchanged with the electronic device through the short range transceiver and then a first status information message is received from the electronic device within a threshold time while the proximity function is activated, the controller may be further configured to deactivate the proximity function and to change the status of the mobile device to a first status.

In this example mobile device, if a second status information message is received through the short range transceiver while the proximity function is deactivated, the controller may be further configured to change the status of the mobile device to a second status and to activate the proximity function.

According to an example embodiment of the disclosure, a method of controlling an electronic device including a first antenna having first directionality toward a first directional area, a second antenna having second directionality toward a second directional area, and a third antenna having omnidirectionality in all directions may include steps of performing omnidirectional communication through the third antenna; and deactivating the third antenna and activating the second antenna when a first event occurs in connection with a mobile device located in the first directional area.

This example method may further include step of deactivating the second antenna and activating the third antenna when the mobile device is moved to the second directional area during activation of the second antenna.

This example method may further include step of deactivating the third antenna and activating the first antenna when a second event occurs while the mobile device is located in the second directional area and omnidirectional communication is performed through the third antenna.

This example method may further include step of changing a status of the electronic device from a first status to a second status when the mobile device is moved to the second directional area during activation of the second antenna.

In this example method, the first event may be an event of receiving room key information from the mobile device through the third antenna, and the step of deactivating the third antenna and activating the second antenna may be performed when the room key information is received through the third antenna after room number information is transmitted through the third antenna.

This example method may further include steps of, when a confirmation message is received from the mobile device through the activated second antenna, determining that the mobile device is moved to the second directional area, and deactivating the second antenna and activating the third antenna.

In this example method, the second event may be a door open event, and the step of deactivating the third antenna and activating the first antenna may be performed when a confirmation message is received from the mobile device through the activated first antenna within a predetermined time.

According to an example embodiment of the disclosure, a method of controlling a mobile device may include steps of receiving a status information message from an electronic device through a proximity function of a short range transceiver; and controlling the proximity function and a status of the mobile device, based on the received status information message.

In this example method, the controlling step may include, if key information is exchanged with the electronic device through the short range transceiver and then a first status information message is received from the electronic device within a threshold time while the proximity function is activated, deactivating the proximity function and changing the status of the mobile device to a first status.

In this example method, the controlling step may include, if a second status information message is received through the short range transceiver while the proximity function is deactivated, changing the status of the mobile device to a second status and activating the proximity function.

According to example embodiments of the present disclosure, the electronic device can exactly and/or more precisely determine the location of a user, who has the mobile device, using a plurality of antennas and reduce power consumption.

BRIEF DESCRIPTION OF THE DRAWINGS

These and other aspects, advantages and attendant features of the present disclosure will be more readily apparent from the following detailed description, taken in conjunction with the accompanying drawings, in which like reference numerals refer to like elements, and wherein.

DETAILED DESCRIPTION

Figure 1A:
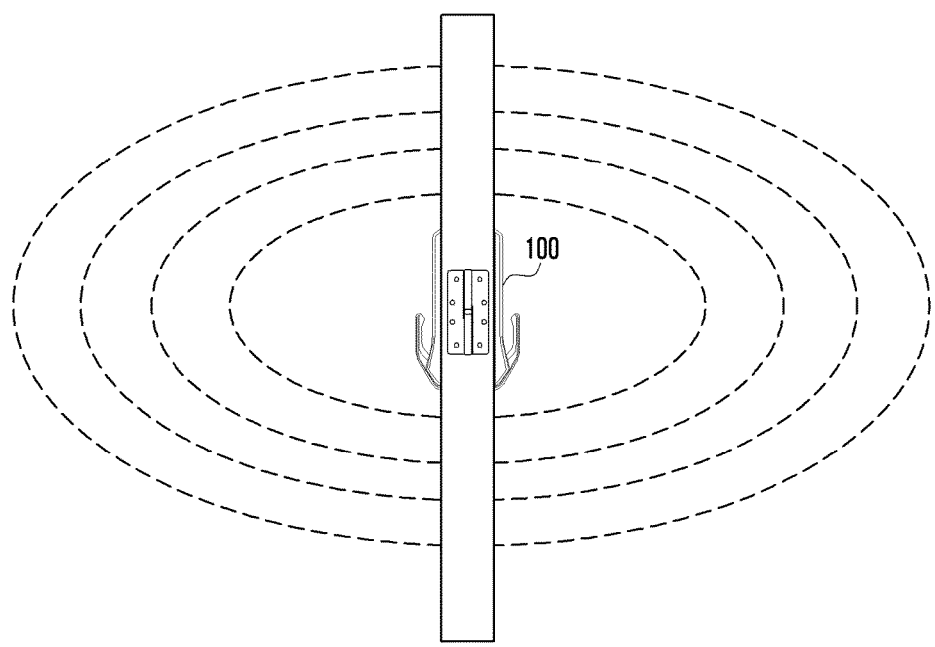
FIGS. 1A and 1B are diagrams illustrating an example electronic device according to an embodiment of the present disclosure.

Hereinafter, example embodiments of the present disclosure will be described with reference to the accompanying drawings. In the following, technical contents well known in the art and having no direct relation to this disclosure may not be described or illustrated in detail to avoid obscuring the subject matter of the present disclosure. Through the drawings, some elements may be exaggerated, omitted or schematically depicted. The same or similar reference numerals denote corresponding features consistently.

Advantages and features of this disclosure and methods for achieving them will become clear with reference to the following example embodiments together with drawings. The present disclosure is, however, not limited to the example embodiments set forth herein and may be embodied in many different forms. Rather, the disclosed example embodiments are provided to aid in understanding of the disclosure.

The expression "1", "2", "first", or "second" used in various example embodiments of this disclosure may modify various elements of such example embodiments but does not limit the corresponding elements. The above expressions do not limit the sequence and/or importance of the elements but may be used for distinguishing one element from other elements.

The terms used in describing various example embodiments of this disclosure are only examples for describing various embodiments but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

In addition, the term "module" or "unit" used herein may refer to an element for performing at least one function, operation, or task and may be implemented by software and/or hardware (e.g., circuitry). A plurality of modules or units may be configured to reside on an addressable storage medium and configured to execute on one or more processors or processing circuitry.

FIG. 1A is a diagram illustrating an example electronic device 100 implemented as a door lock according to an example embodiment of the present disclosure. Such a door lock may be installed on a door of each room in a residential house, a building, a hotel, and the like. A door lock is, however, an example only. The electronic device 100 may be implemented as various kinds of devices which can perform communication with any other electronic device.

The electronic device 100 may include, but is not limited to, a first antenna having first directionality, a second antenna having second directionality, and a third antenna having omni-directionality, e.g., all directionalities.

For example, when the electronic device 100 is a door lock installed on a door of a room, the first directionality may, for example, indicate a direction toward the outside of the room and the second directionality may, for example indicate a direction toward the inside of the room. In this example, the electronic device 100 may communicate with another electronic device located outside of the room using the first antenna having the first directionality or the third antenna having the omni-directionality. Similarly, the electronic device 100 may communicate with another electronic device located inside of the room using the second antenna having the second directionality or the third antenna having the omni-directionality.

Figure 1B:
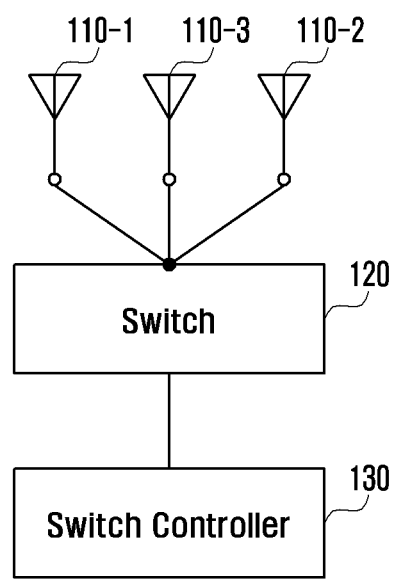

For example, as illustrated in FIG. 1B, the electronic device 100, e.g., a door lock, may include a first antenna 110-1, a second antenna 110-2, a third antenna 110-3, a switch 120, and a switch controller 130.

The electronic device 100 may include the switch 120 for activating or deactivating each of the first antenna 110-1, the second antenna 110-2 and the third antenna 110-3 under the control of the switch controller 130. The switch controller 130 may be, for example, and without limitation, a circuit, an application-specific integrated circuit or at least one processor.

Normally, at a residential house, a building, a hotel, etc., room conditions may be regulated by sensing/determining whether a user occupies a room. For example, if it is determined that a room is unoccupied, a hotel or the like may perform a heating and cooling control of a room for energy saving.

In an example of having a plurality of antennas as discussed above, the electronic device 100, e.g., a door lock, may determine a user's location by sensing a direction in which a user's mobile device performs communication through such antennas.

However, since the electronic device 100 performs communication through the plurality of antennas, this causes an increase in power consumption. Therefore, the switch 120 and the switch controller 130 are required for activating or deactivating each of the first antenna 110-1, the second antenna 110-2 and the third antenna 110-3.

Figure 2:
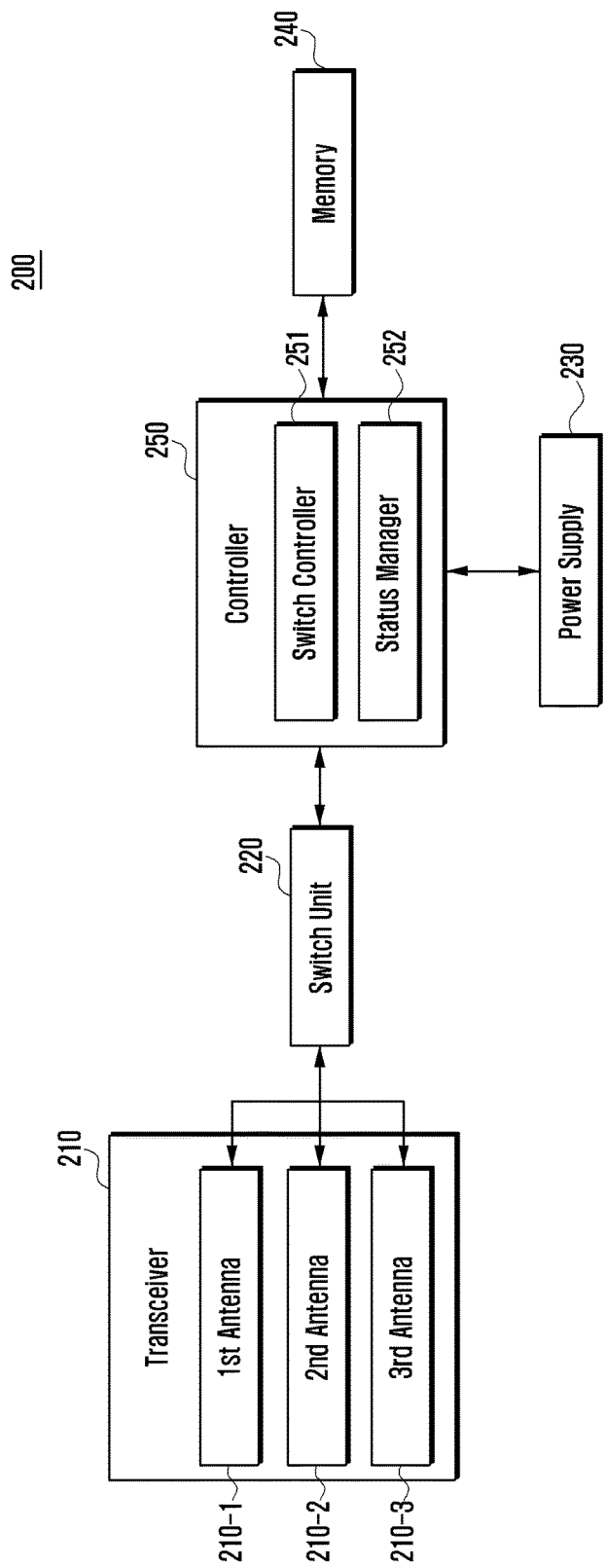
FIG. 2 is a block diagram illustrating an example electronic device according to an example embodiment of the present disclosure.

Hereinafter, the electronic device for reducing power consumption and also easily determining a user's location will be described in greater detail with reference to FIG. 2 according to an example embodiment of the present disclosure. It will be assumed, for ease of description in this example embodiment that the electronic device illustrated in FIG. 2 is a door lock 200 installed on a room door of a hotel.

The door lock 200 may include a transceiver 210, a switch unit (e.g., including switching circuitry) 220, a power supply 230, a memory 240, and a controller 250. The controller 250 may be a circuit, an application-specific integrated circuit or at least one processor.

The transceiver 210 is configured to perform communication with another electronic device. For example, the door lock 200 may communicate with a smart phone through the transceiver 210.

The transceiver 210 may include a first antenna 120-1 having first directionality, a second antenna 210-2 having second directionality, and a third antenna 210-3 having omni-directionality. For example, the first directionality may refer to the direction toward the outside of a room, and the second directionality may refer to the direction toward the inside of a room.

The switch unit 220 may include various switching circuitry configured to activate or deactivate each of the first antenna 210-1, the second antenna 210-2, and the third antenna 210-3.

The power supply 230 is configured to supply electric power to the door lock 200. For example, the power supply 230 may be connected to a separate power supply device such as a battery and thereby supply electric power to the door lock 200.

The memory 240 is configured to store a variety of kinds of information. For example, the memory 240 may store a program for executing a method for controlling the activation and deactivation of the first, second and third antennas 210-1, 210-2 and 210-3.

The memory 240 may also store identification information, such as an ID, of a user's mobile device received through the transceiver 210.

The controller 250 is configured to generally control the door lock 200.

The controller 250 may activate the third antenna 210-3 for communication in all directions. If a first event occurs in connection with a mobile device located in the first directional area during such omnidirectional communication, the controller 250 may control the switching circuitry of the switch unit 220 to deactivate the third antenna 210-3 and instead activate the second antenna 210-2.

If it is determined that the second antenna 210-2 is activated and the mobile device moves to the second directional area, the controller 250 may change the status of the door lock 200 from a first status to a second status.

If it is determined that the second antenna 210-2 is activated and the mobile device moves to the second directional area, the controller 250 may control the switching circuitry of the switch unit 220 to deactivate the second antenna 210-2 and instead activate the third antenna 210-3.

For example, if the second antenna 210-2 is activated and if a confirmation message is received from the mobile device through the second antenna 210-2, the controller 250 may determine that the mobile device moves to the second directional area. Therefore, the controller 250 may control the switching circuitry of the switch unit 220 to deactivate the second antenna 210-2 and to activate the third antenna 210-3.

For example, the first directional area may be the outside of a room, and the second directional area may be the inside of a room. If any first event occurs in connection with the mobile device located in the outside of a room while the third antenna 210-3 is activated and performs omnidirectional communication, the controller 250 may control the switching circuitry of the switch unit 220 to deactivate the third antenna 210-3 and also to activate the second antenna 210-2.

The first event may, for example, be an event that the door lock 200 receives room key information from the mobile device through the third antenna 210-3. If room number information (or key number information) contained in the received room key information is matched with room number information stored in the door lock 200, the controller 250 may control the switch unit 220 to deactivate the third antenna 210-3 and to activate the second antenna 210-2.

If it is determined that the second antenna 210-2 is activated and the mobile device moves to the inside of the room, the controller 250 may control the switching circuitry switch unit 220 to deactivate the second antenna 210-2 and to activate the third antenna 210-3.

If a second event occurs in connection with the mobile device located in the second directional area while the third antenna 210-3 performs omnidirectional communication, the controller 250 may control the switching circuitry switch unit 220 to deactivate the third antenna 210-3 and to activate the first antenna 210-1.

The second event may be a door open event. If the first antenna 210-1 may be activated in response to the door open event and if a confirmation message is received from the mobile device through the first antenna 210-1 within a threshold time, the controller 250 may control the switching circuitry of the switch unit 220 to deactivate the first antenna 210-1 and to activate the third antenna 210-3.

The controller 250 may receive identification information, such as an ID, of the mobile device (e.g., a user's terminal) through the confirm message. Therefore, the controller 250 may store information about a movement of the identified particular user's terminal into the inside of the room.

The controller 250 may include various elements such as, for example, and without limitation a switch controller 251 and a status manager 252. The switch controller 251 and the status manager 252 may be implemented as a separate hardware module or circuitry equipped in the controller 250. This is, however, simply an example only and both may be implemented as a specific program stored in a memory included in the controller 250.

The switch controller 251 may control the switching circuitry of the switch unit 220 that activates or deactivates each antenna.

The status manager 252 may determine the status of the door lock 200. For example, if the door lock 200 receives previous user's checkout information and if the next user does not open the door yet, the status manager 252 may determine the status of the door lock 200 as 'USER OUTSIDE'.

If any user opens a door and if a confirmation message is received from a user's mobile device, the status manager 252 may determine the status of the door lock 200 as 'USER INSIDE'.

Figure 3:
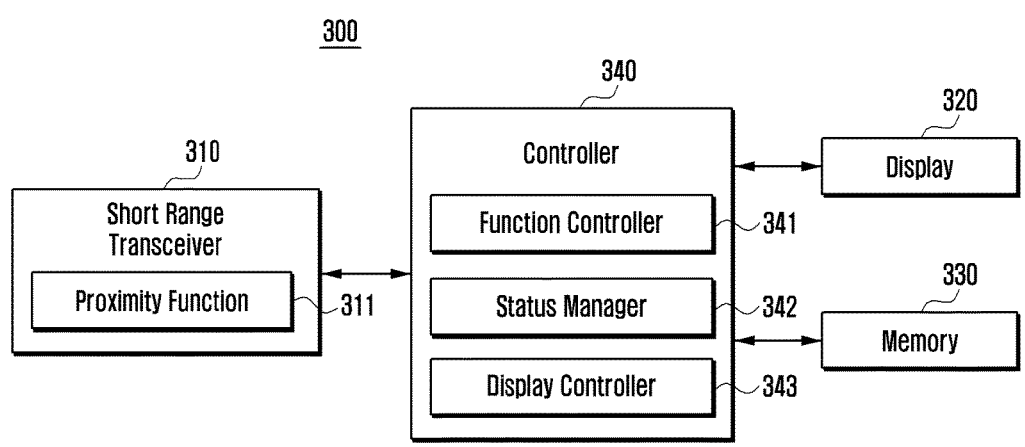
FIG. 3 is a block diagram illustrating an example mobile device according to an example embodiment of the present disclosure.

FIG. 3 is a block diagram illustrating an example mobile device 300 that performs communication with an electronic device such as the above-discussed door lock 200. The mobile device 300 may, for example, be a smart phone, a cellular phone, a PDA, a smart watch, a smart glass, a tablet PC, and any other equivalent or similar electronic device.

As illustrated in FIG. 3, the mobile device 300 may include a short range transceiver 310, a display 320, a memory 330, and a controller 340. The controller 340 may be a circuit, an application-specific integrated circuit or at least one processor.

The short range transceiver 310 may be configured to communicate with any external device. The short range transceiver 310 may include various communication circuitry included in modules, such as, for example, and without limitation, a Wi-Fi chip, a Bluetooth chip, and a near field communication (NFC) chip, for performing communication with external devices. The Wi-Fi chip, the Bluetooth chip and the NFC chip perform their specific communication based on Wi-Fi, Bluetooth and NFC techniques, respectively. The Bluetooth chip may have a Bluetooth low energy (BLE) sensor.

The short range transceiver 310 may have a proximity function. As will be described in greater detail below, the mobile device 300 may transmit room key information containing room number information to the door lock 200 using the proximity function of the short range transceiver 310.

The display 320 is configured to display a user interface (UI). In an example embodiment, the display 320 may be omitted. The display 320 may display a specific UI regarding a door open or lock. For example, when a user having the mobile device 300 is approaching the door lock 200, the display 320 may display a door-open UI. Therefore, using the displayed door-open UI, the user may open the door easily.

The memory 330 is configured to store various kinds of information. For example, the memory 330 may store a particular program for performing communication with the door lock 200 and controlling a door open or lock.

The controller 340 is configured to generally control the mobile device 300. For example, if any predetermined event occurs and if a status information message is received from the door lock 200, the controller 340 may control the proximity function and the status of the mobile device 300, based on the received status information message.

For example, if key information is exchanged with the door lock 200 through the short range transceiver 310 and then a first status information message is received from the door lock 200 within a threshold time while the proximity function is activated, the controller 340 may deactivate the proximity function and also change the status of the mobile device 300 to a first status.

For example, if a second status information message is received through the short range transceiver 310 while the proximity function is deactivated, the controller 340 may change the status of the mobile device 300 to a second status and also activate the proximity function.

Figure 4A:
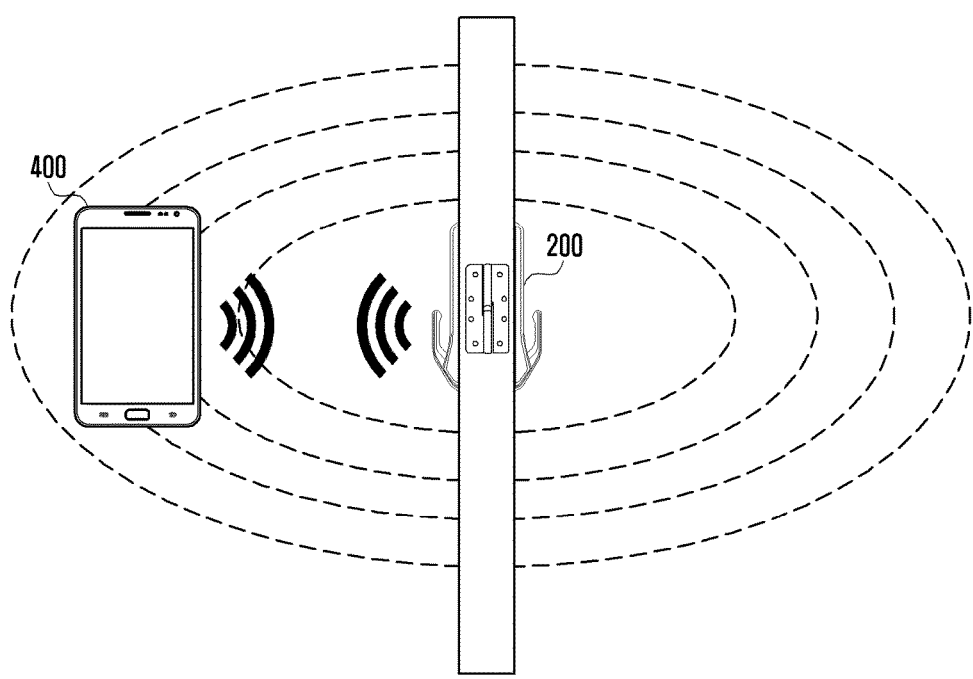
FIGS. 4A, 4B and 4C are diagrams illustrating example movement of a mobile device, communicating with an electronic device, from a first directional area to a second directional area according to an example embodiment of the present disclosure.
Figure 4B:
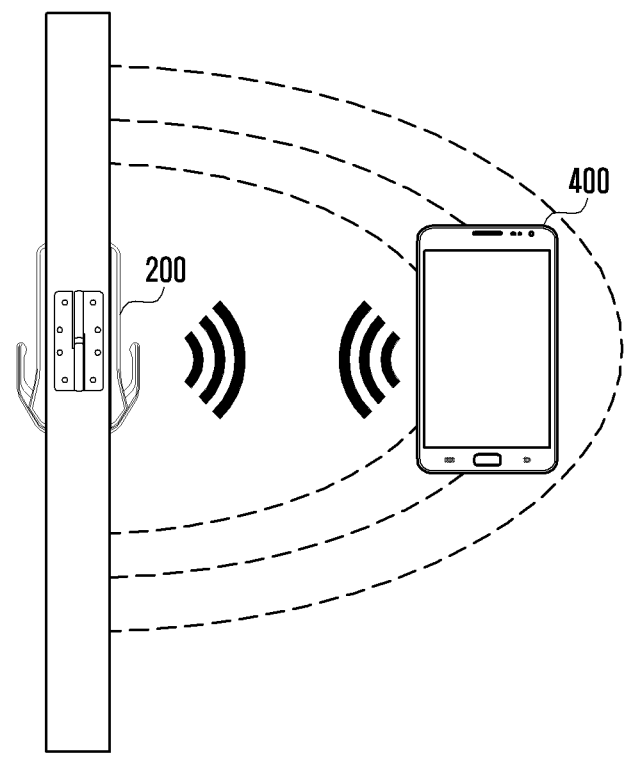
Figure 4C:
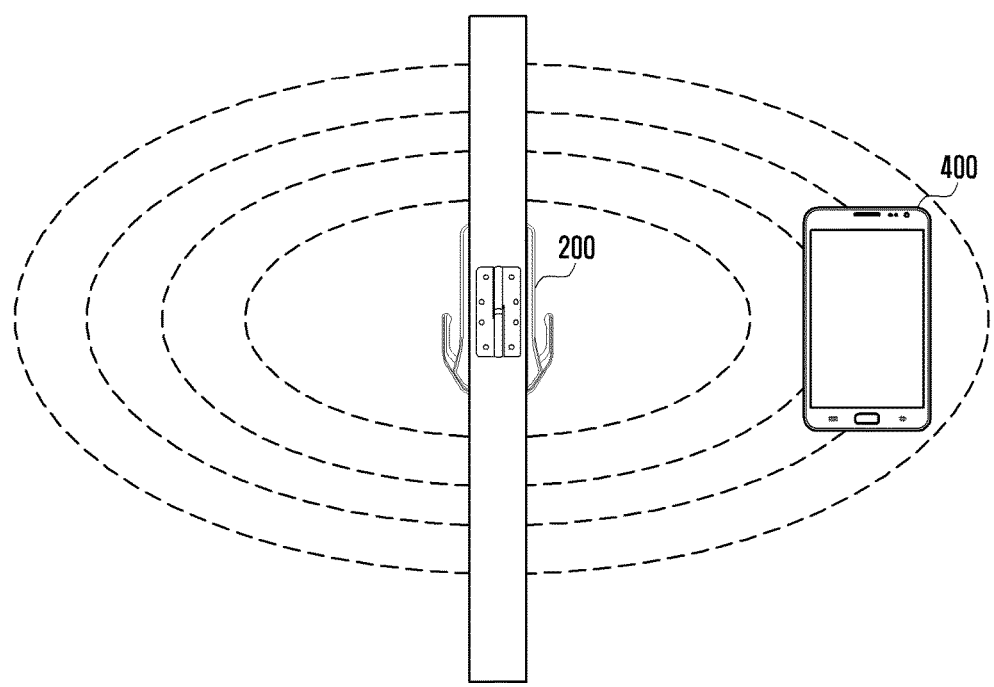

FIGS. 4A, 4B and 4C are diagrams illustrating example movement of a mobile device, communicating with an electronic device, from a first directional area to a second directional area according to an example embodiment of the present disclosure.

In this example embodiment, assume that the mobile device 400 is a user's smart phone. Also, assume that the electronic device is the door lock 200 installed on a room door. And also, assume that the first and second directions indicate the outside and inside of a room, respectively. These assumptions are provided to aid in understanding and do not limit the disclosure or example embodiments.

In a normal state, by activating the third antenna 210-3 (see, e.g., FIG. 2), the door lock 200 may perform communication with any electronic device located in the inside or outside of the room. As illustrated in FIG. 4A, when the mobile device 400 is located outside of the room, the door lock 200 may perform communication with the mobile device 400 using the activated third antenna 210-3.

For example, the mobile device 400 may perform communication with the door lock 200 using the proximity function of the short range transceiver 310.

The door lock 200 which is installed in each room may broadcast room number information through the third antennal 210-3.

The user may store room key information including room number information in the mobile device 400 while, for example, checking in at a hotel. For example, through a suitable hotel application, the mobile device 400 may store a room key capable of opening the room.

When the user having the mobile device 400 is approaching the room after check-in, the mobile device 400 may receive room number information from the door lock 200 through, for example, the proximity function of the BLE sensor. If the received room number information is identical with the room number information stored at check-in, the mobile device 400 may transmit room key information to the door lock 200.

Since the third antenna is activated, the door lock 200 may receive the room key information transmitted from the outside of the room. When the room key information is received, the door lock 200 may open the door. Also, the door lock 200 may change the status to a "USER INSIDE" status.

FIG. 4B is a diagram illustrating an example communication state after the user enters the room and then the door is locked again. The door lock 200 may deactivate the third antenna 210-3 and activate the second antenna. 210-2. Therefore, the door lock 200 may perform communication with the mobile device 400 located in the inside of the room through the second antenna 210-2.

The door lock, which is placed in the 'USER INSIDE' status, may transmit 'Room_number_IN' information through the second antenna 210-2. The door lock 200 may transmit this 'Room_number_IN' information for a threshold time (e.g., one or two seconds). Since the user may not enter the room even through the door opens, the door lock 200 transmits the 'Room_number_IN' information for a short time so that the mobile device 400 can receive the 'Room_number_IN' information in the inside of the room only.

When the mobile device 400 located inside the room receives the 'Room_number_IN' information through the proximity function of the short range transceiver 310, the status of the mobile device 400 may be changed to an 'INSIDE' status. And the mobile device 400 may deactivate the proximity function.

Using the proximity function, the mobile device 400 may receive the room number information broadcasted by the door lock 200. Therefore, if the proximity function is activated in the inside of the room, the mobile device 400 may receive the room number information and then display a related popup or sound an alarm, or the door may open automatically.

Therefore, the mobile device 400 located inside the room may deactivate the proximity function so as not to receive the room number information from the door lock 200.

Additionally, the mobile device 400 may transmit a confirmation message to the door lock 200.

The door lock 200 that receives the confirmation message may deactivate the second antenna 210-2 and activate the third antenna 210-3. Then the door lock 200 may broadcast again the room number information through the third antenna 210-3.

Receiving such a confirmation message from the mobile device 400 at the door lock 200 is an example only. Although such a confirmation message is not received, the door lock

200 may deactivate the second antenna 210-2 and activate the third antenna 210-3 after a threshold time from the open of the door.

Figure 5A:
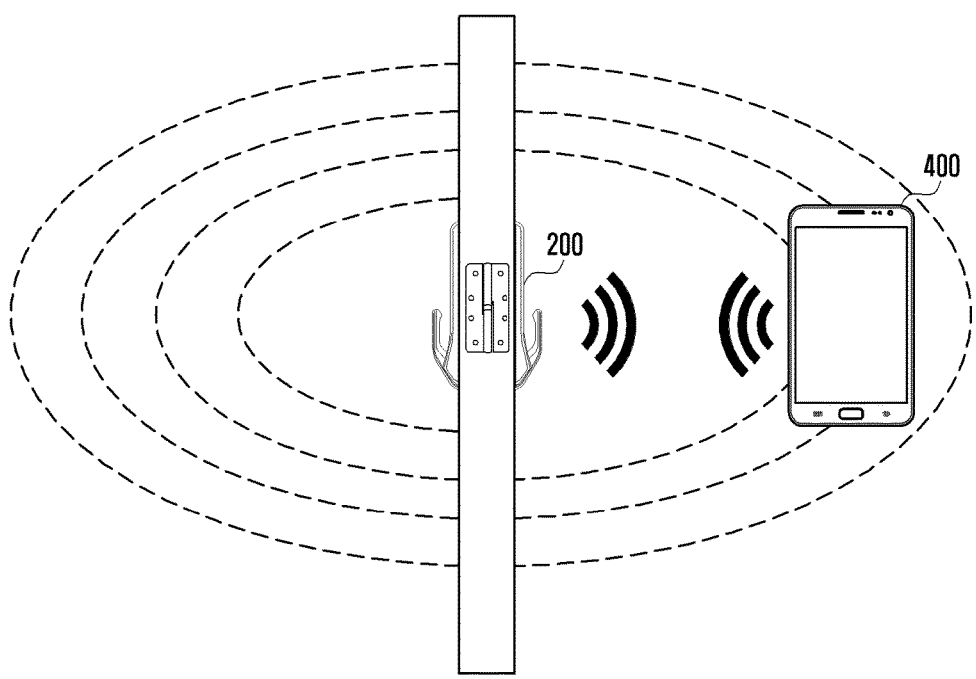
FIGS. 5A, 5B and 5C are diagrams illustrating example movement of a mobile device, communicating with an electronic device, from a second directional area to a second directional area according to an example embodiment of the present disclosure.
Figure 5B:
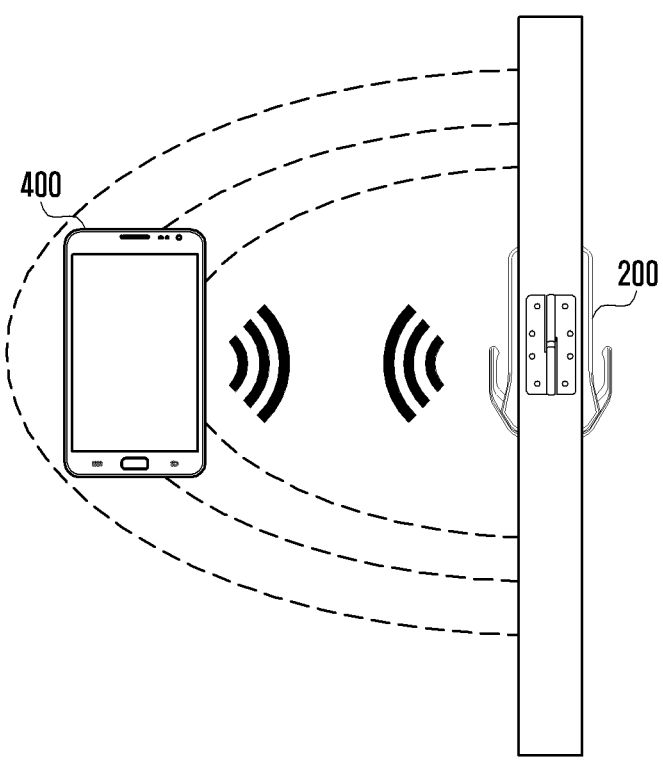
Figure 5C:
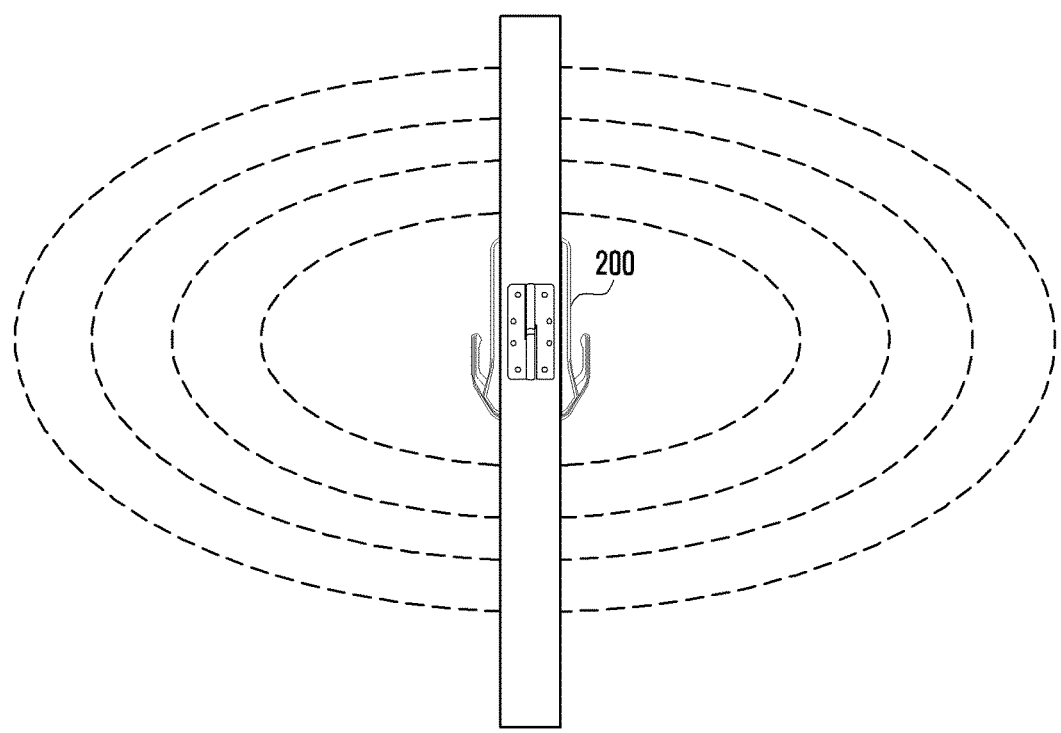

FIGS. 5A, 5B and 5C are diagrams illustrating example movement of a mobile device, communicating with an electronic device, from a second directional area to a second directional area according to an example embodiment of the present disclosure.

As illustrated in FIG. 5A, the mobile device 400 located inside the room may transmit a door open command to the door lock 200 in response to a user's manipulation. Alternatively, this door open command may be input into the door lock 200 directly by the user.

When it is detected that the door is opened and then locked while the third antenna 210-3 is activated, the door lock 200 may change the status thereof to a 'USER OUTSIDE', deactivate the third antenna 210-3, and activate the first antenna 210-1.

Also, the door lock 200 may transmit 'Room_number_OUT' information to the outside of the room through the first antenna 210-1.

As illustrated in FIG. 5B, after being moved outside the room, the mobile device 400 may receive the 'Room_number_OUT' information being sent to the outside of the room. The mobile device 400 that receives the 'Room_number_OUT' information may change the status thereof to an 'OUTSIDE' status and activate again the proximity function of the short range transceiver 310. Also, the mobile device 400 which is placed in the 'OUTSIDE' status may transmit a confirmation message to the door lock 200.

The door lock 200 that receives the confirmation message from the mobile device 400 may stop the transmission of the 'Room_number_OUT' information. As illustrated in FIG. 5C, the door lock 200 may deactivate the first antenna 210-1 and activate the third antenna 210-3. Also, the door lock 200 may broadcast again the room number information through the third antenna 210-3.

If the mobile device 400 does not move to the outside of the room even though the door is opened and then locked, the door lock 200 may receive a confirmation message through the first antenna 210-1. Therefore, the door lock 200 may change the status thereof from 'USER OUTSIDE' to 'USER INSIDE'.

Hereinafter, control methods between the electronic device and the mobile device will be described with reference to FIGS. 6 to 10.

Figure 6:
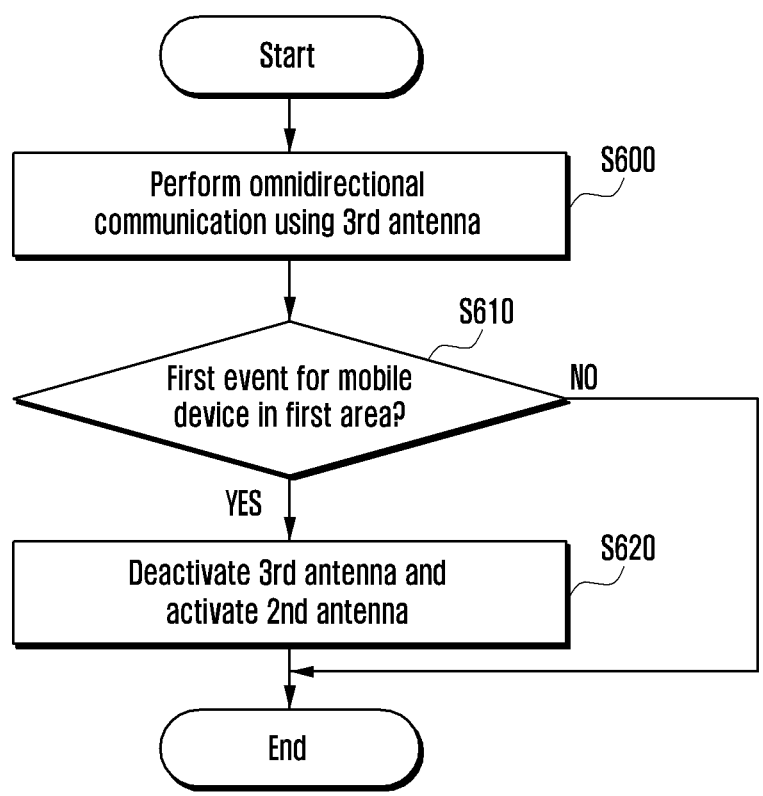
FIG. 6 is a flowchart illustrating an example control method of an electronic device according to an example embodiment of the present disclosure.

FIG. 6 is a flowchart illustrating an example method of controlling an electronic device according to an example embodiment of the present disclosure. At step S600, the electronic device may perform omnidirectional communication by activating and using the third antenna. If the electronic device is a door lock installed on each room door of a hotel in an example embodiment, the electronic device may perform communication with any mobile device located in the inside or outside of the room through the third antenna.

At step S610, the electronic device may determine whether a first event occurs in connection with the mobile device located in a first directional area. According to an example embodiment, the first directional area may be the outside of the room door.

The first event may, for example, be an event that the mobile device transmits room key information to the electronic device when room number information broadcasted by the electronic device is identical with room number information previously stored in the mobile device. For example, a user of the mobile device may store the room key information including the room number information in the mobile device while checking in. For example, through a suitable hotel application, the mobile device may store a room key capable of opening the room.

When the user having the mobile device is approaching the room after check-in, the mobile device may receive room number information from the door lock through a proximity function of a BLE sensor. If it is determined that the received room number information is identical with room number information stored at check-in, the mobile device may transmit the room key information to the door lock.

After the occurrence of the first event as discussed above, the electronic device may deactivate the third antenna and activate the second antenna at step S620.

Figure 7:
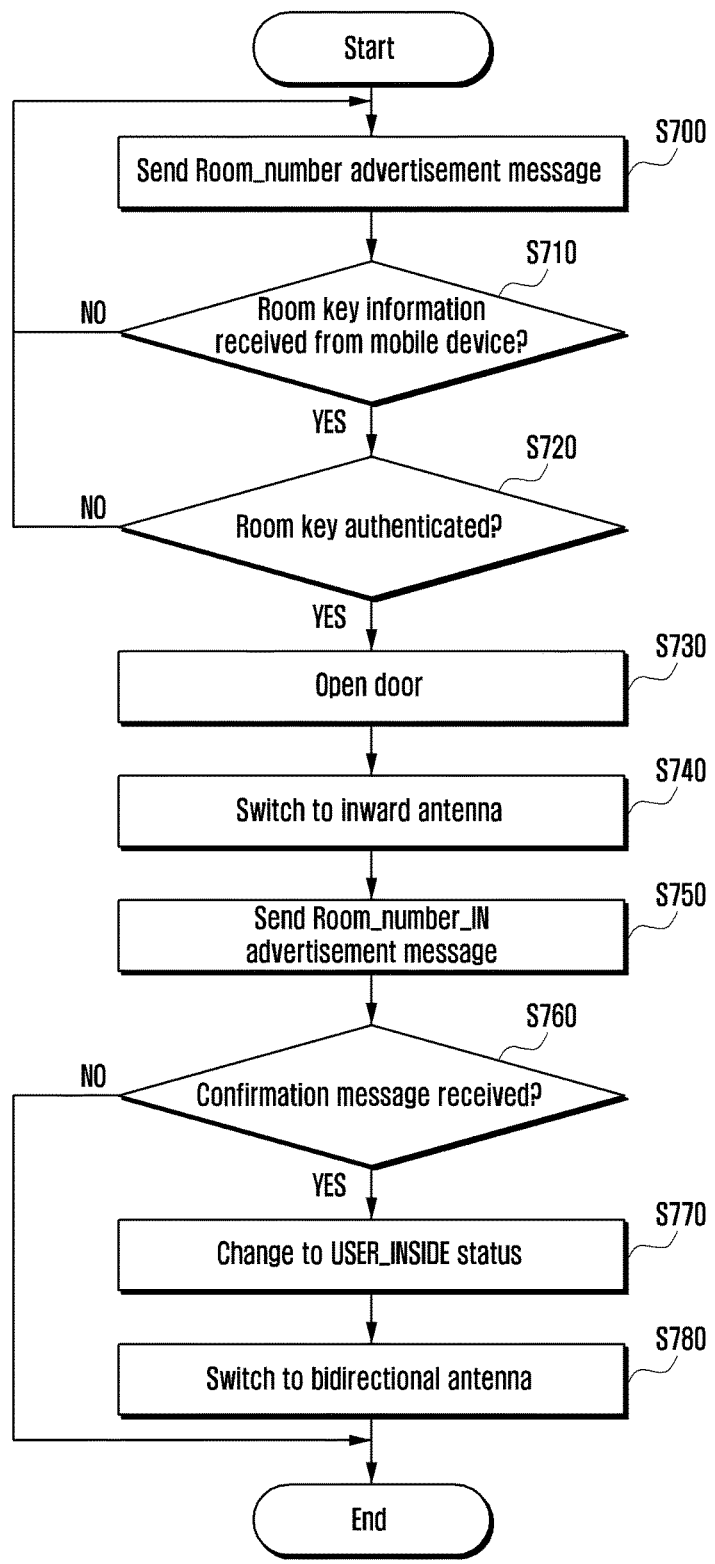
FIG. 7 is a flowchart illustrating an example control method of an electronic device communicating with a mobile device moving from the outside of a room to the inside according to an example embodiment of the present disclosure.

FIG. 7 is a flowchart illustrating an example method of controlling an electronic device (implemented, for example, as a door lock) communicating with a mobile device moving from the outside of a room to the inside according to an example embodiment of the present disclosure.

At step S700, the door lock may transmit a 'Room_number advertisement' message. The door lock which is placed in the initial status may perform omnidirectional communication through the third antenna. Therefore, the door lock may transmit the 'Room_number advertisement' message using the third antenna.

If the room key information is received from the mobile device at step S710 and if authentication of a room key succeeds at step S720, the door lock may open the door at step S730.

For example, the 'Room_number advertisement' message transmitted through the third antenna by the door lock may contain the room number information. The mobile device which is approaching the door lock may compare the stored room number information with room number information in the received 'Room_number advertisement' message. If it is determined as a result of comparison that the stored room number information is identical with that in the received 'Room_number advertisement' message, the mobile device may transmit the room key information to the door lock.

The door lock that receives the room key information may perform authentication and then open the door.

At step S740, the door lock may switch to an antenna having inward directionality. For example, the door lock may deactivate the third antenna and instead activate the second antenna.

At step S750, the door lock may transmit a 'Room_number_IN advertisement' message using the second antenna. For example, the door lock may activate the second antenna and then transmit the 'Room_number_IN advertisement' message for a threshold time. Since the 'Room_number_IN advertisement' message is a message for identifying a user's mobile device that moves to the inside of the room after a door open, the door lock may transmit this message for a relatively short time.

When a confirmation message is received from the mobile device at step S760, the door lock may change the status thereof to a 'USER INSIDE' status at step S770.

The door lock placed in the 'USER INSIDE' status may switch to an antenna having omni-directionality at step S780. For example, the door lock may deactivate the second antenna and instead activate the third antenna.

Figure 8:
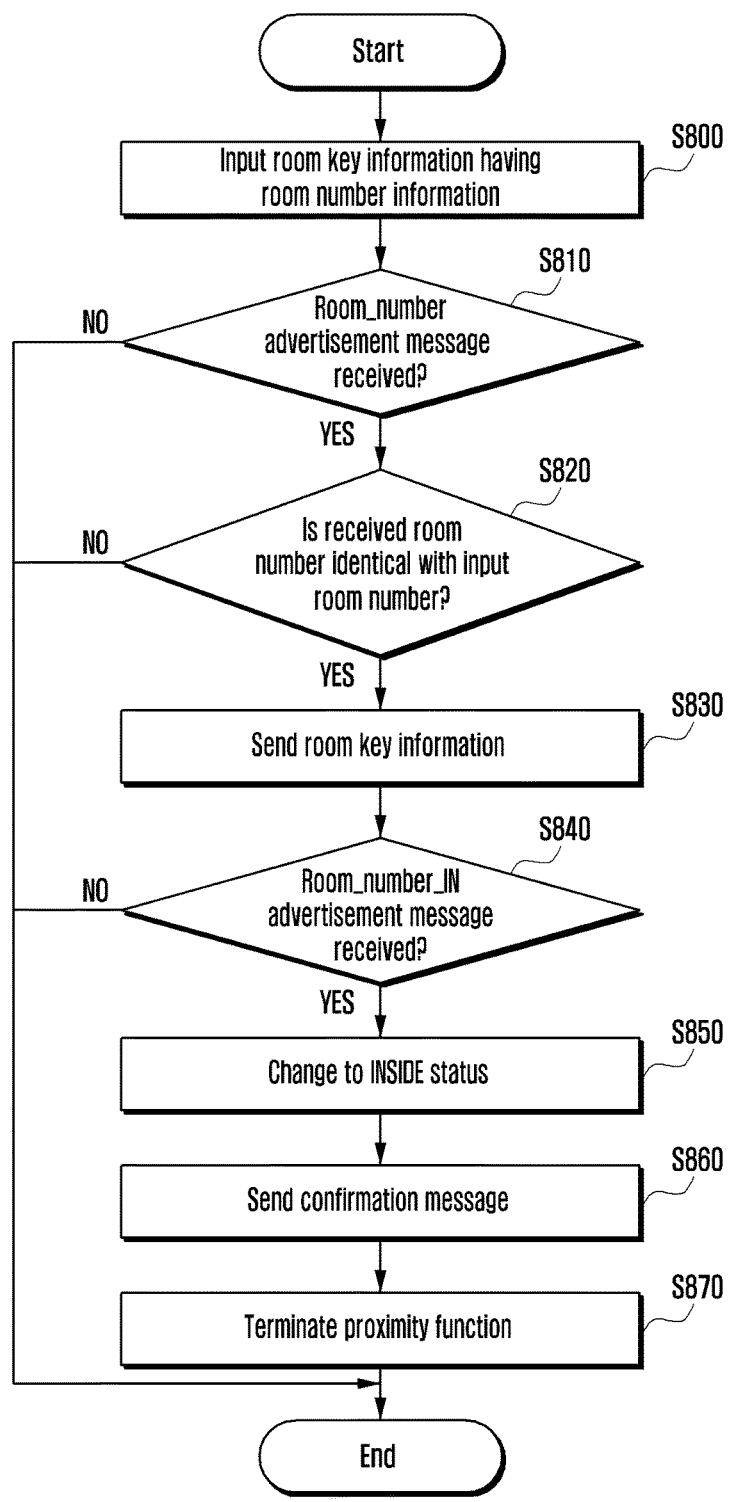
FIG. 8 is a flowchart illustrating an example control method of a mobile device moving from the outside of a room to the inside according to an example embodiment of the present disclosure.
Figure 9:
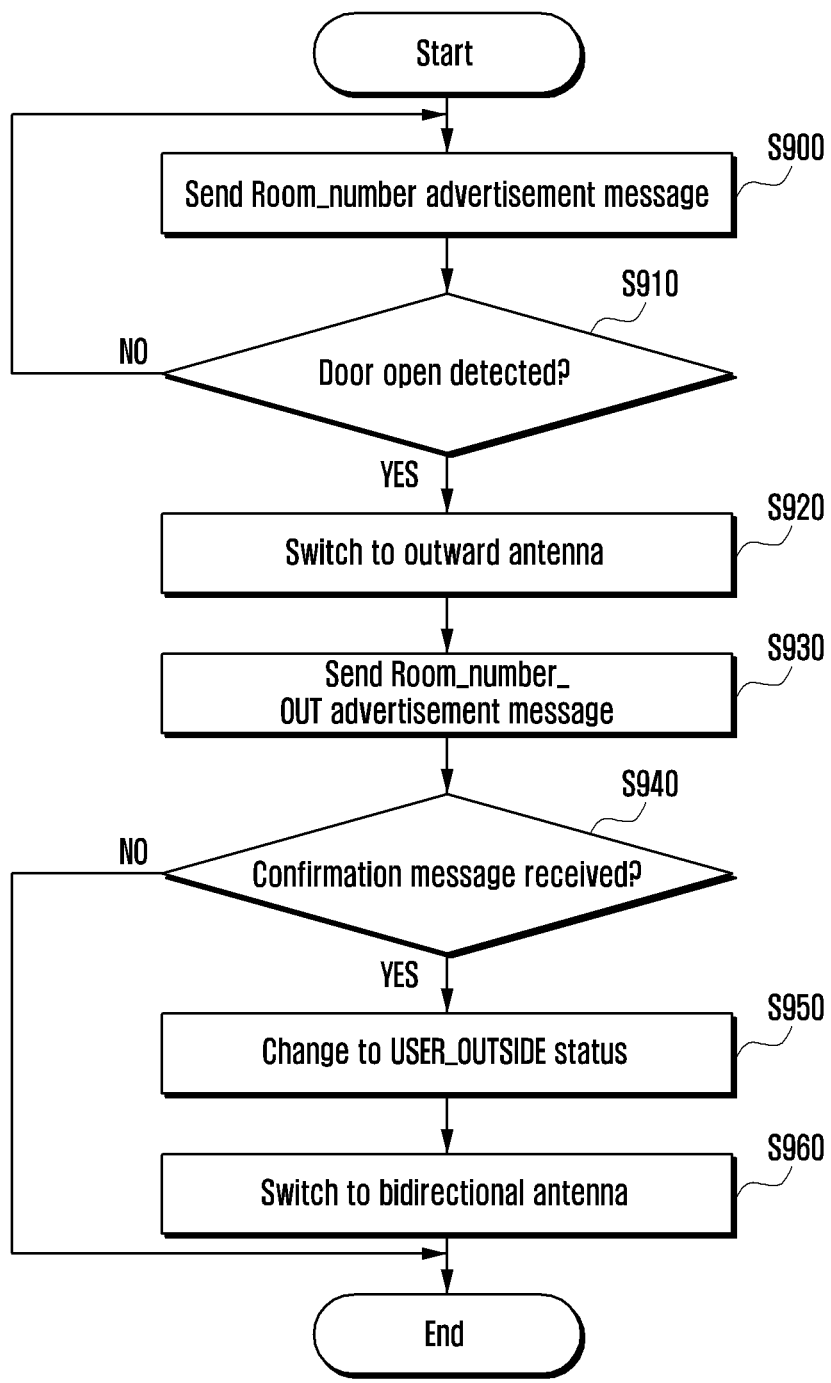
FIG. 9 is a flowchart illustrating an example control method of an electronic device communicating with a mobile device moving from the inside of a room to the outside according to an example embodiment of the present disclosure.

While the door lock performs the above-discussed operations, the mobile device may perform operations as illustrated in FIG. 8.

Referring now to FIG. 8, at step S800, the mobile device may receive the room key information including the room number information. For example, the room key information may be input by a hotel staff when the user checks in.

If the 'Room_number advertisement' message is received at step S810, the mobile device may determine at step S820 whether the room number information contained in the received 'Room_number advertisement' message is identical with the previously input room number information.

If the received room number information is identical with the input room number information as a result of determination, the mobile device may transmit the room key information to the door lock at step S830.

If the 'Room_number_IN advertisement' message is received at step S840, the mobile device may change the status thereof to an 'INSIDE' status at step S850.

The mobile device which is placed in the 'INSIDE' status may transmit a confirmation message to the door lock at step S860. At step S870, the mobile device may terminate the proximity function of the short range transceiver.

The above operations may be automatically performed when the mobile device or the user thereof is located within a predetermined distance from the door lock.

Figure 15A:
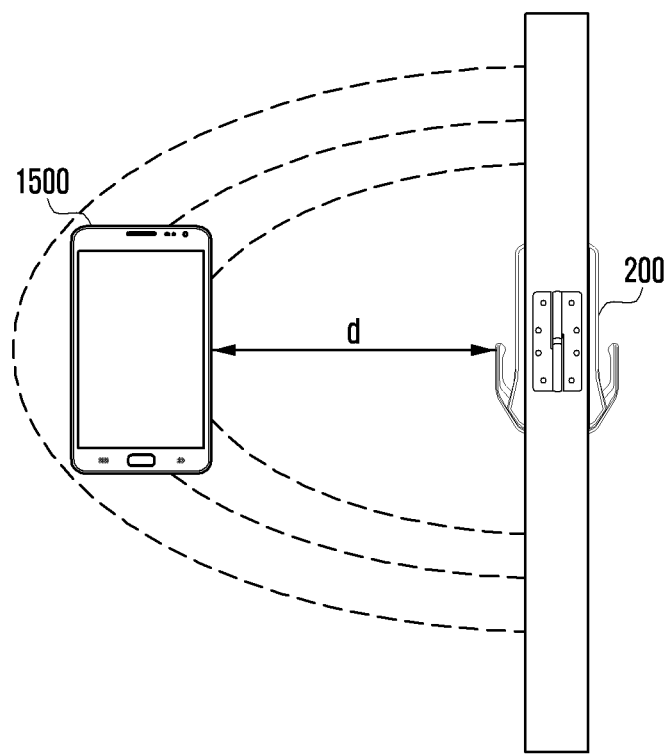
FIGS. 15A and 15B are diagrams illustrating an example distance between a mobile device and a door lock, and relation between such a distance and an RSSI according to an example embodiment of the present disclosure.

As illustrated, for example, in FIG. 15A, the mobile device 1500 may perform a door open operation depending on a distance (d) between the door lock 200 and the mobile device 1500.

For example, the mobile device 1500 may receive an advertisement message from the door lock 200 through the BLE sensor thereof. The mobile device 1500 may measure signal strength, e.g., a received signal strength indicator (RSSI), of the received message.

If the measured signal strength indicates a certain distance smaller than a threshold distance, the mobile device 1500 may perform a door open operation.

Figure 15B:
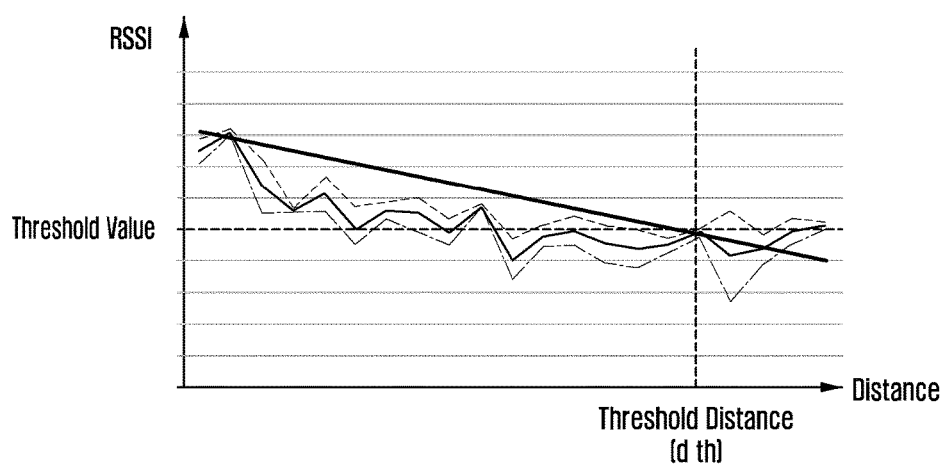

For example, if it is determined that a distance between the mobile device 1500 and the door lock 200 is within the threshold distance (dth) as illustrated in FIG. 15B, the mobile device 1500 may execute a relevant application of the hotel at which the user checks in.

Figure 16:
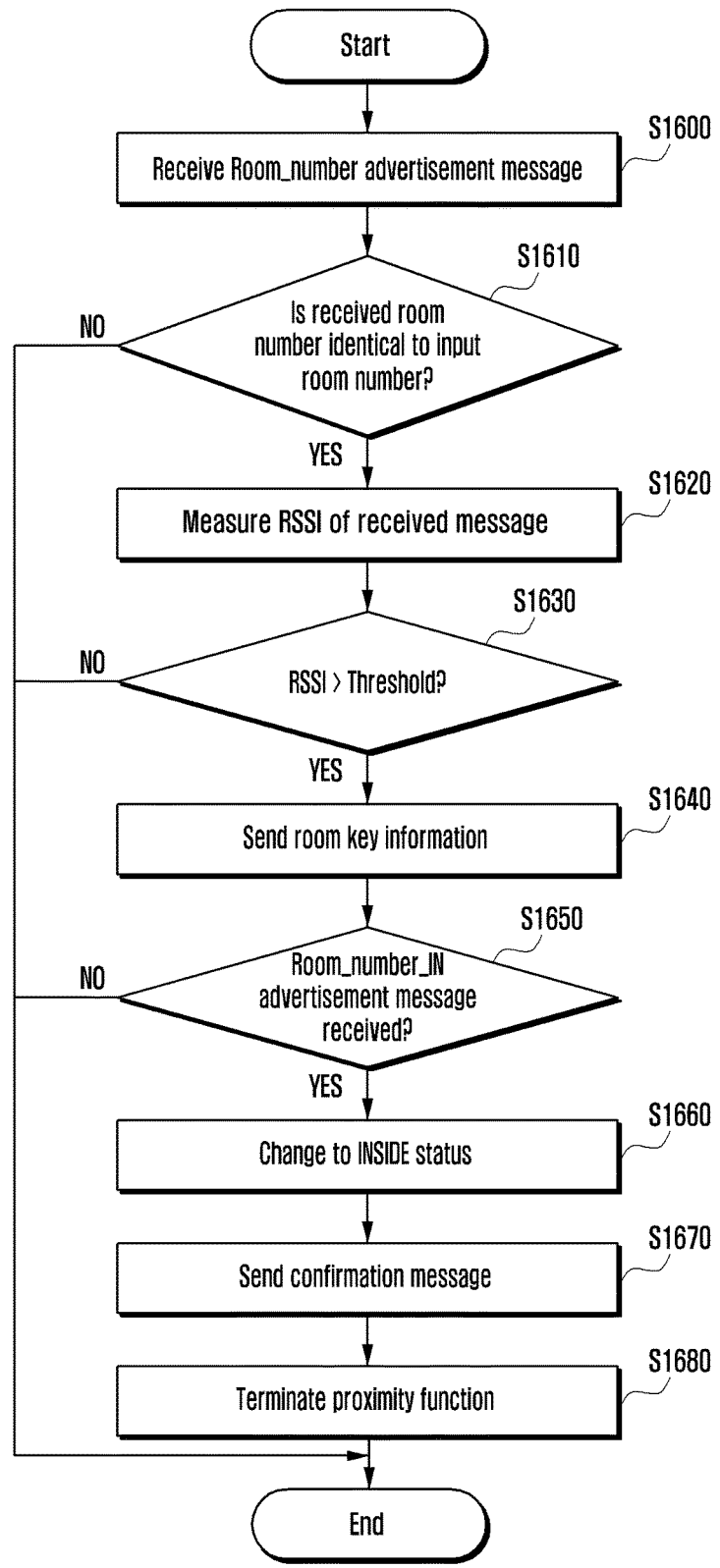
FIG. 16 is a flowchart illustrating an example method of a mobile device for measuring an RSSI and thereby performing a door open operation according to an example embodiment of the present disclosure.

Referring to FIG. 16, example operations of the mobile device 1500 are as follows. At step S1600, the mobile device may receive the 'Room_number advertisement' message. For example, using the BLE sensor, the mobile device may receive the 'Room_number advertisement' message from the door lock.

At step S1610, the mobile device may determine whether the room number information contained in the received 'Room_number advertisement' message is identical with the previously input room number information.

If identical as a result of determination, the mobile device may measure an RSSI of the received message at step S1620.

Normally, as a distance between signal transmitting and receiving devices is closer, the RSSI is higher. At step S1630, the mobile device may determine whether the measured RSSI is greater than a predetermined threshold value.

If the measured RSSI exceeds the predetermined threshold value, the mobile device may transmit the room key information to the door lock at step S1640.

Additionally, if the 'Room_number_IN advertisement' message is received at step S1650, the mobile device may change the status thereof to the 'INSIDE' status at step S1660.

The mobile device which is placed in the 'INSIDE' status may transmit a confirmation message to the door lock at step S1670. Then, at step S1680, the mobile device may terminate the proximity function of the short range transceiver.

As discussed hereinbefore, by measuring RSSI of the received message, the mobile device may perform automatically the door open operation when a distance from the door lock is closer than the threshold distance.

Referring back to FIG. 9, FIG. 9 is a flowchart illustrating an example method of controlling an electronic device (implemented, for example, as a door lock) communicating with a mobile device moving from the inside of a room to the outside according to an example embodiment of the present disclosure.

At step S900, the door lock may transmit a 'Room_number advertisement' message through the third antenna having omni-directionality.

If a door open is detected at step S910, the door lock may switch to an antenna having outward directionality at step S920. For example, the door lock may deactivate the third antenna having omni-directionality and activate the first antenna having outward directionality.

Then, at step S930, the door lock may transmit a 'Room_number_OUT advertisement' message through the first antenna.

When a confirmation message is received from the mobile device in the outside of the door through the first antenna at step S940, the door lock may change the status thereof to the 'USER OUTSIDE' status at step S950.

Also, at step S960, the door lock may switch to an antenna having bi-directionality. For example, the door lock may deactivate the first antenna having outward directionality and activate the third antenna having omni-directionality.

After activating the third antenna, the door lock may broadcast the 'Room_number advertisement' message through the third antenna.

Figure 10:
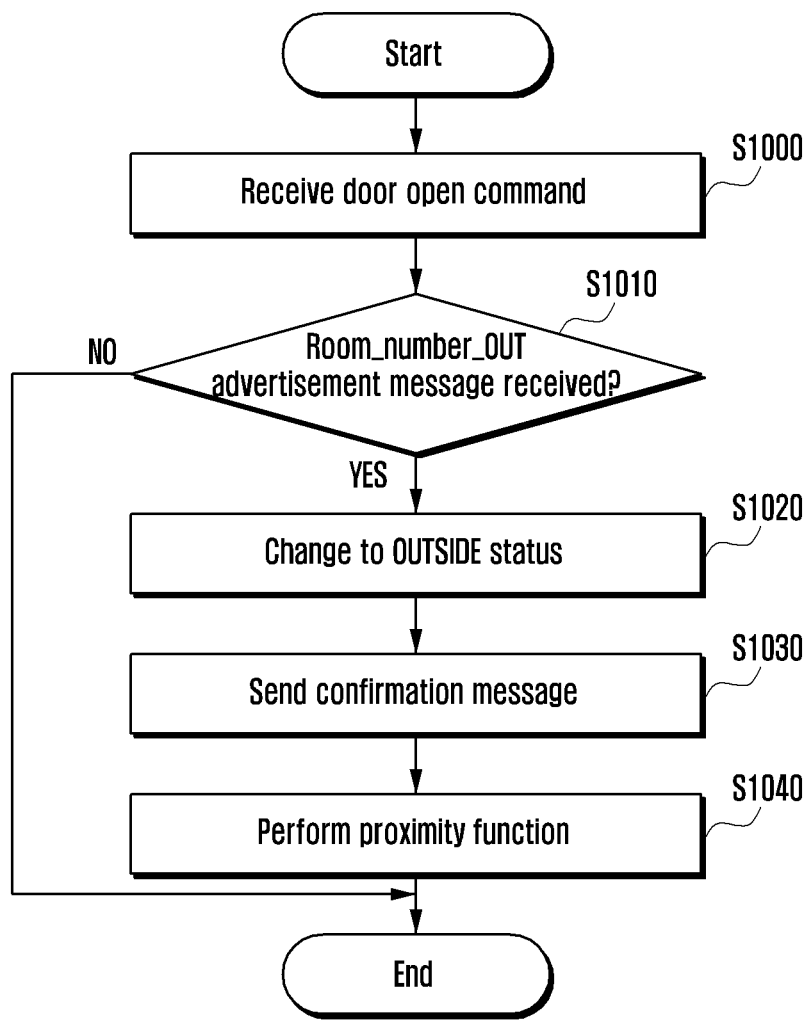
FIG. 10 is a flowchart illustrating an example control method of a mobile device moving from the inside of a room to the outside according to an example embodiment of the present disclosure.

While the door lock performs the above-discussed operations, the mobile device may perform operations as illustrated in FIG. 10.

At step S1000, the mobile device may receive a door open command. In a certain embodiment, this step S1000 may be omitted. For example, if the user directly inputs a door open command to the door lock, the mobile device may fail to receive the door open command.

If the mobile device receives the 'Room_number_OUT advertisement' message at step S1010, the mobile device may change the status thereof to the 'OUTSIDE' status at step S1020.

The mobile device may transmit a confirm message for notifying a change to the 'OUTSIDE' status to the door lock at step S1030 and then perform the proximity function at step S1040.

For example, the mobile device that is located in the outside of the room should offer, to a user, information about a door open by displaying a door open UI or the like when the 'Room_number advertisement' message is received from the door lock. Therefore, when approaching the door lock, the mobile device may perform the proximity function so as to receive the 'Room_number advertisement' message.

Hereinafter, another example in which there are two or more mobile devices will be described in greater detail.

Figure 11A:
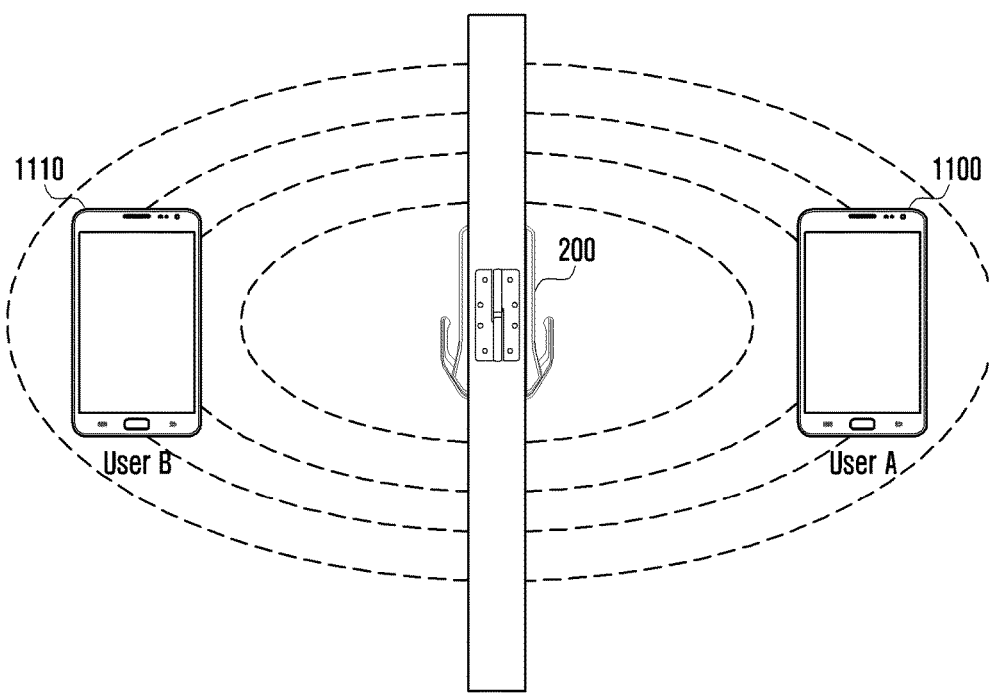
FIGS. 11A, 11B and 11C are diagrams illustrating example movement of a second mobile device, performing communication with an electronic device, from a first directional area to a second directional area while a first mobile device is located in the second directional area according to an example embodiment of the present disclosure.
Figure 11B:
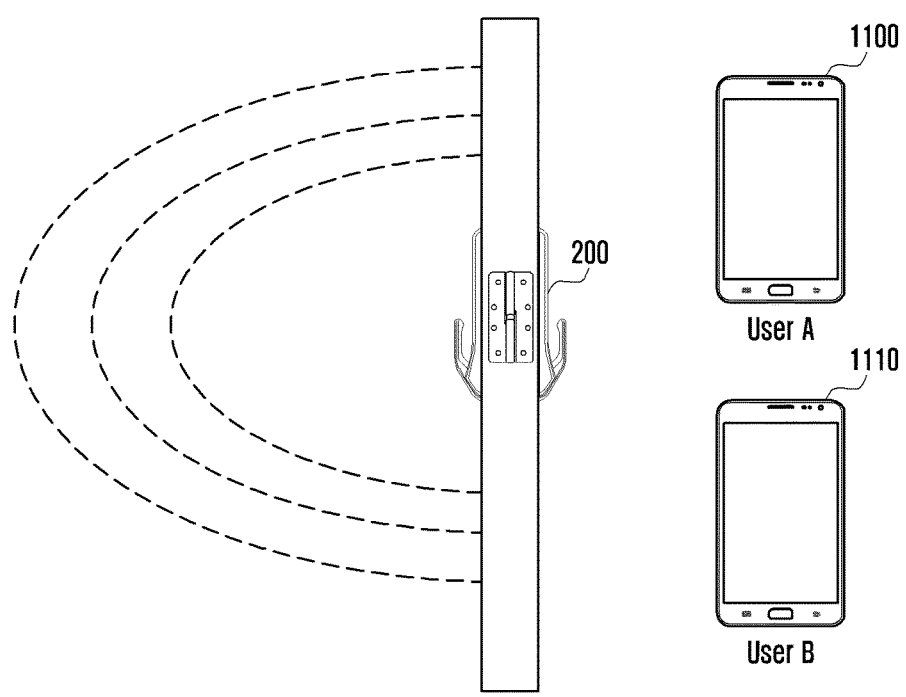
Figure 11C:
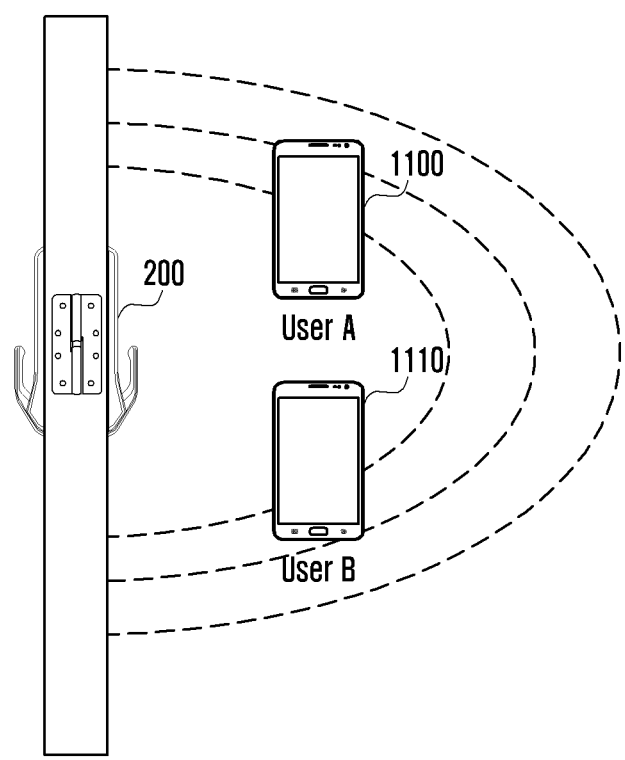

FIGS. 11A, 11B and 11C are diagrams illustrating example movement of a second mobile device 1110, performing communication with the door lock 200, from the outside of the room to the inside while a first mobile device 1100 is located in the inside of the room according to an example embodiment of the present disclosure.

The door lock 200 may activate the third antenna having omni-directionality and then broadcast the 'Room_number advertisement' message.

Hereinafter, assume, for ease of description, that a door open command is input by the first mobile device 1100 or the door lock 200, instead of opening the door in response to an input of a room key from the second mobile device 1110.

As illustrated in FIG. 11B, the door lock 200 may deactivate the third antenna having omni-directionality and activate the first antenna when the door is opened and then closed. The door lock 200 may not know any reason of a door open, namely, whether the user goes in or out of the room. Therefore, the door lock 200 activates the first antenna having outward directionality.

If any confirmation message is not received through the first antenna, the door lock 200 may deactivate the first antenna and instead activate the second antenna as illustrated in FIG. 11C.

Through the second antenna, the door lock 200 may transmit information about door opening and closing to at least one of the first and second mobile devices 1100 and 1110 located in the inside of the room.

At least one of the first and second mobile devices 1100 and 1110 that receives such information about door opening and closing may display the received information on a suitable UI, sound a related alarm, or emit an LED attached thereon.

Therefore, even though the door is opened regardless of user's intention, the user can be readily aware of a door open.

Figure 12A:
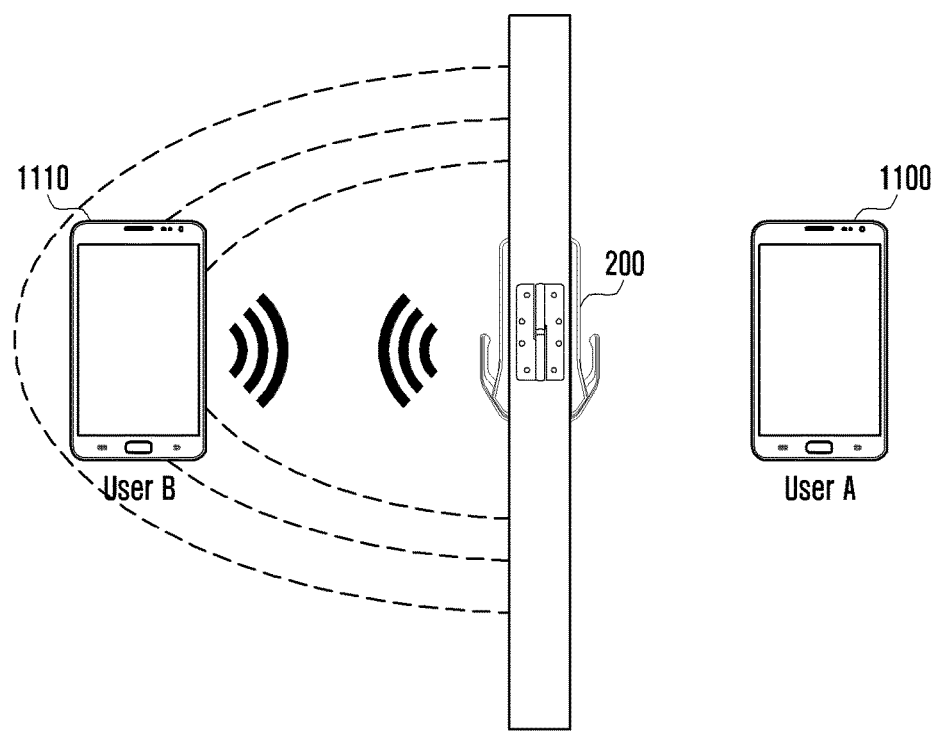
FIGS. 12A and 12B are diagrams illustrating example movement of a second mobile device from a second directional area to a first directional area while a first mobile device is located in the second directional area according to an example embodiment of the present disclosure.
Figure 12B:
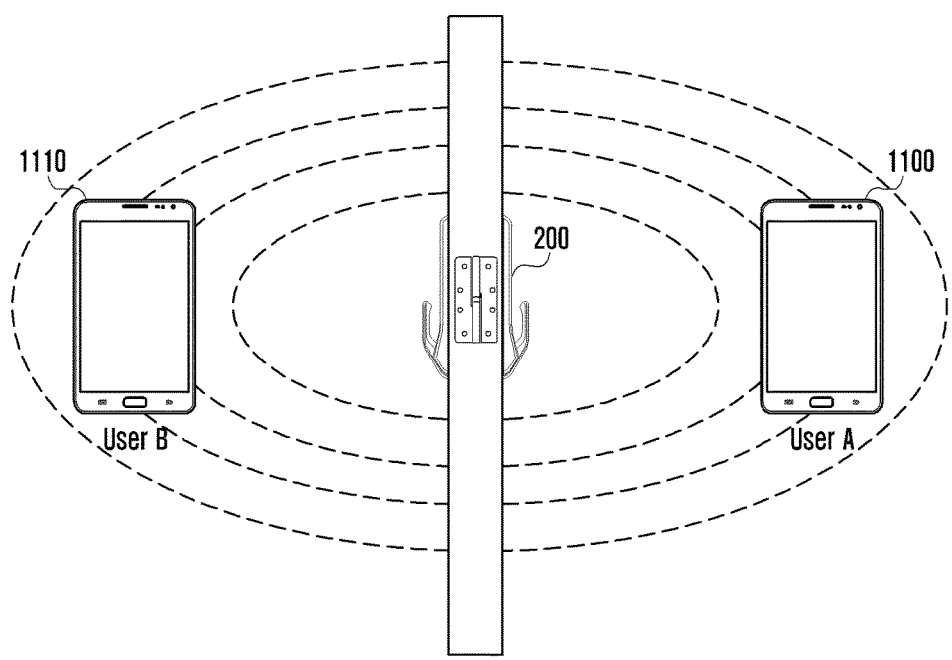

FIGS. 12A and 12B are diagrams illustrating example movement of the second mobile device 1110 from the inside of the room to the outside while the first mobile device 1100 is located in the inside of the room according to an example embodiment of the present disclosure.

When each of the first and second mobile devices 1100 and 1110 opens the door and then enters the room through the door lock 200, or when each of the first and second mobile devices 1100 and 1110 transmits a confirm message in the inside of the room, the door lock 200 may deactivate the third antenna having omni-directionality. Also, the door lock 200 may activate the first antenna having outward directionality.

If the second mobile device 1110 only is moved to the outside of the room as illustrated in FIG. 12A, the door lock 200 may receive a confirmation message from the second mobile device 1110 only through the first antenna.

Since the confirmation message is received from only one mobile device, the door lock 200 may deactivate the first antenna and activate the omnidirectional third antenna as illustrated in FIG. 12B. Then the door lock 200 may broadcast the 'Room_number advertisement' message through the third antenna.

Figure 13A:
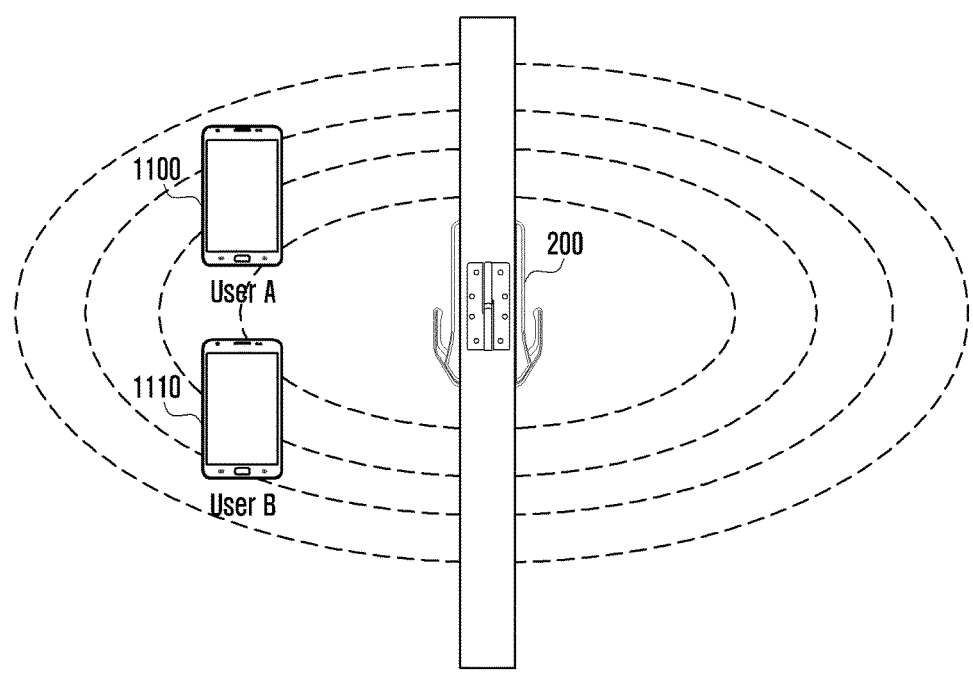
FIGS. 13A, 13B and 13C are diagrams illustrating example movement of first and second mobile devices, one of which communicates with an electronic device, from a first directional area to a second directional area according to an example embodiment of the present disclosure.
Figure 13B:
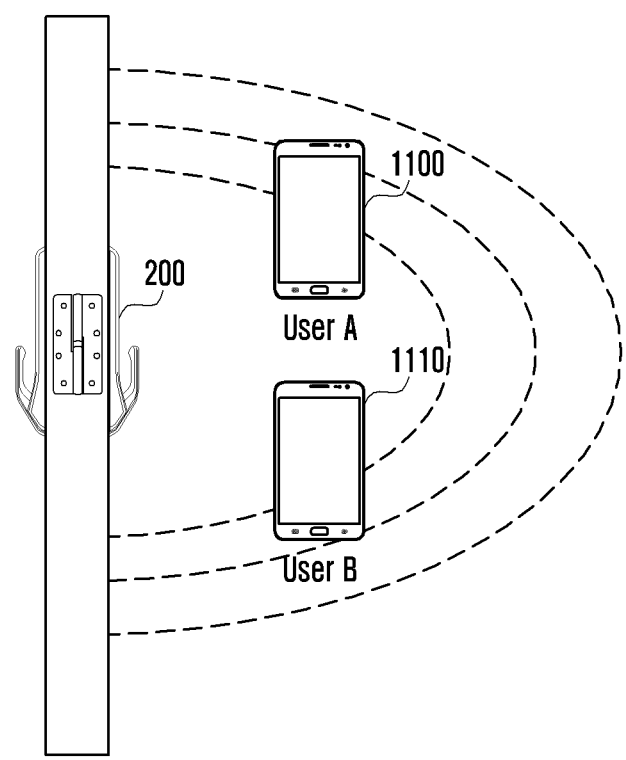
Figure 13C:
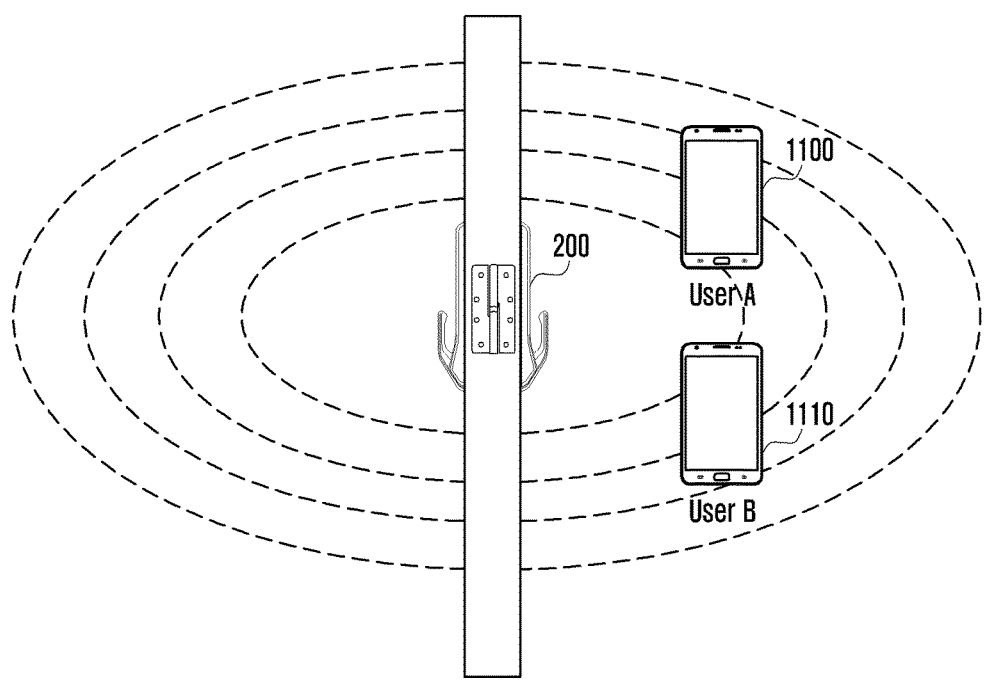

FIGS. 13A, 13B and 13C are diagrams illustrating example movement of the first and second mobile devices 1100 and 1110, one of which communicates with the door lock 200, from the outside of the room to the inside according to an example embodiment of the present disclosure.

As illustrated in FIG. 13A, the door lock 200 may activate the omnidirectional third antenna and broadcast the 'Room_number advertisement' message through the third antenna.

If the room key information is received from one of the first and second mobile devices 1100 and 1110, the door is opened. Then, as illustrated in FIG. 13B, the door lock 200 may deactivate the third antenna and activate the second antenna.

While the door is opened, the first and second mobile devices 1100 and 1110 may be moved into the room.

Then the door lock 200 may transmit the 'Room_number_IN advertisement' message. For example, the door lock 200 may send this message through the second antenna for a threshold time after the door is closed.

If the threshold time elapses, or if a confirmation message is received from any mobile device through the second antenna, the door lock 200 may deactivate the second antenna and activate the third antenna as illustrated in FIG. 13C. Then the door lock 200 may broadcast the 'Room_number advertisement' message through the third antenna.

Figure 14A:
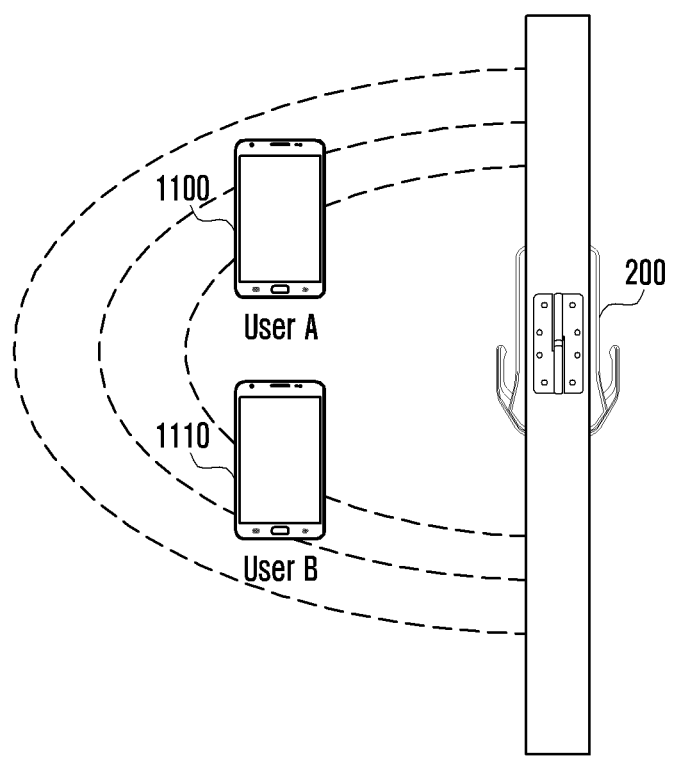
FIGS. 14A and 14B are diagrams illustrating example simultaneous movement of first and second mobile devices from a first directional area to a second directional area according to an example embodiment of the present disclosure.
Figure 14B:
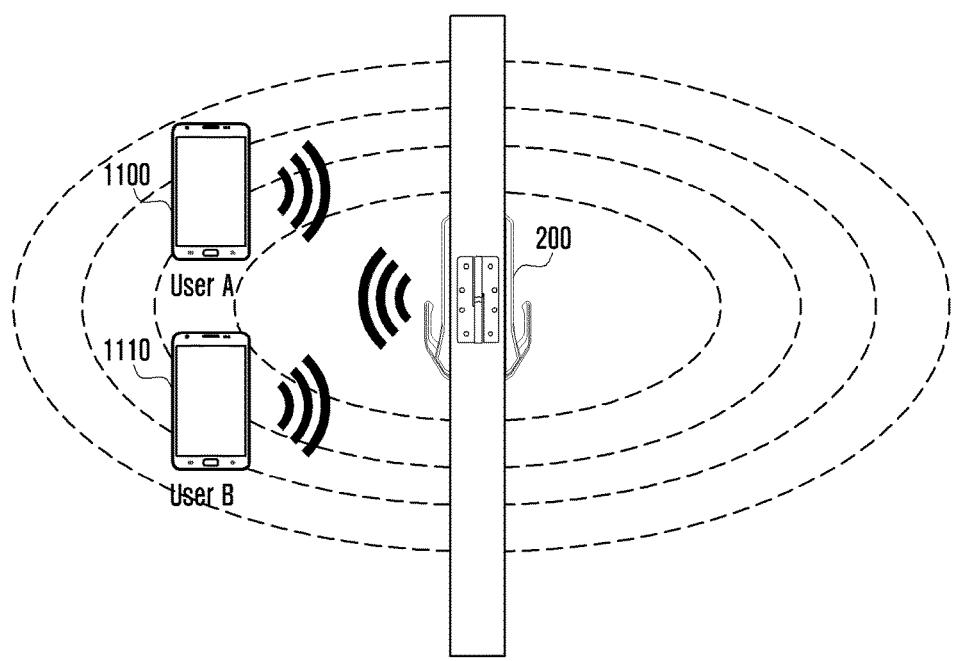

FIGS. 14A and 14B are diagrams illustrating example simultaneous movement of the first and second mobile devices 1100 and 1110 from the inside of the room to the outside according to an example embodiment of the present disclosure.

When each of the first and second mobile devices 1100 and 1110 opens the door and then enters the room through the door lock 200, or when each of the first and second mobile devices 1100 and 1110 transmits a confirmation message from the inside of the room, the door lock 200 may deactivate the omnidirectional third antenna. Then the door lock 200 may activate the first antenna having outward directionality.

Since the first and second mobile devices 1100 and 1110 are moved to the outside of the room as illustrated in FIG. 14A, the door lock 200 may receive a confirmation message from each of the first and second mobile devices 1100 and 1110 through the first antenna.

The door lock 200 that receives the confirmation messages may deactivate the first antenna and activate the omnidirectional third antenna as illustrated in FIG. 14B. Then the door lock 200 may broadcast the 'Room_number advertisement' message through the third antenna.

If any mobile device moved to the inside of the room sends the confirmation message, or if any mobile device transmits the room key information with ID inserted, the door lock 200 may store the identification information about such a mobile device.

Therefore, when the confirmation messages are received from all mobile devices located in the outside of the room and if the identification information thereof are stored, the door lock 200 may deactivate the first antenna and activate the third antenna.

The first and second mobile devices 1100 and 1110 moved to the outside of the room and transmitting the confirm messages may be changed to the 'OUTSIDE' status and perform the proximity function.

A program code for performing the above-discussed method may be recorded in a non-transitory computer-readable storage medium. The non-transitory computer-readable storage medium may include, for example, a CD, a DVD, a hard disk, a blue-ray disk, a USB, a memory card, a ROM, and the like.

While the present disclosure has been illustrated and described with reference to various example embodiments thereof, it will be understood by those skilled in the art that various changes in form and details may be made therein without departing from the scope of the disclosure and defined by the appended claims.

What is claimed is:

1. An electronic device comprising:
 a transceiver configured to perform communication using a first antenna having a first directionality toward a first directional area, a second antenna having a second directionality toward a second directional area, and a third antenna having omni-directionality in all directions;

switching circuitry configured to activate or deactivate each of the first, second and third antennas; and a controller configured to control the switching circuitry to deactivate the third antenna and to activate the second antenna when a first event occurs in connection with a mobile device located in the first directional area during omnidirectional communication through the third antenna.

2. The electronic device of claim 1, wherein the controller is further configured to control the switching circuitry to deactivate the second antenna and to activate the third antenna when the mobile device is moved to the second directional area during activation of the second antenna.

3. The electronic device of claim 2, wherein the controller is further configured to control the switching circuitry to deactivate the third antenna and to activate the first antenna when a second event occurs while the mobile device is located in the second directional area and omnidirectional communication is performed through the third antenna.

4. The electronic device of claim 1, wherein the controller is further configured to change a status of the electronic device from a first status to a second status when the mobile device is moved to the second directional area during activation of the second antenna.

5. The electronic device of claim 1, wherein the first event includes an event of receiving room key information from the mobile device through the third antenna, and wherein the controller is further configured to control the third antenna to transmit room number information and, when the room key information is received through the third antenna, to control the switching circuitry to deactivate the third antenna and to activate the second antenna.

6. The electronic device of claim 1, wherein when a confirmation message is received from the mobile device through the activated second antenna, the controller is further configured to determine that the mobile device is moved to the second directional area, and to control the switching circuitry to deactivate the second antenna and to activate the third antenna.

7. The electronic device of claim 3, wherein the second event includes a door open event, and wherein when a confirmation message is received from the mobile device through the activated first antenna within a predetermined time, the controller is further configured to control the switching circuitry to deactivate the first antenna and to activate the third antenna.

8. A method controlling of an electronic device including a first antenna having first directionality toward a first directional area, a second antenna having second directionality toward a second directional area, and a third antenna having omni-directionality in all directions, the method comprising:

performing omnidirectional communication through the third antenna; and deactivating the third antenna and activating the second antenna when a first event occurs in connection with a mobile device located in the first directional area.

9. The method of claim 8, further comprising:

deactivating the second antenna and activating the third antenna when the mobile device is moved to the second directional area during activation of the second antenna.

10. The method of claim 9, further comprising:

deactivating the third antenna and activating the first antenna when a second event occurs while the mobile device is located in the second directional area and omnidirectional communication is performed through the third antenna.

11. The method of claim 8, further comprising:

changing a status of the electronic device from a first status to a second status when the mobile device is moved to the second directional area during activation of the second antenna.

12. The method of claim 8, wherein the first event includes an event of receiving room key information from the mobile device through the third antenna, and wherein the step of deactivating the third antenna and activating the second antenna is performed when the room key information is received through the third antenna after room number information is transmitted through the third antenna.

13. The method of claim 8, further comprising:

when a confirmation message is received from the mobile device through the activated second antenna, determining that the mobile device is moved to the second directional area, and deactivating the second antenna and activating the third antenna.

14. The method of claim 10, wherein the second event includes a door open event, and wherein the step of deactivating the third antenna and activating the first antenna is performed when a confirmation message is received from the mobile device through the activated first antenna within a predetermined time.

* * * * *